United States Patent Office 2,750,319
Patented June 12, 1956

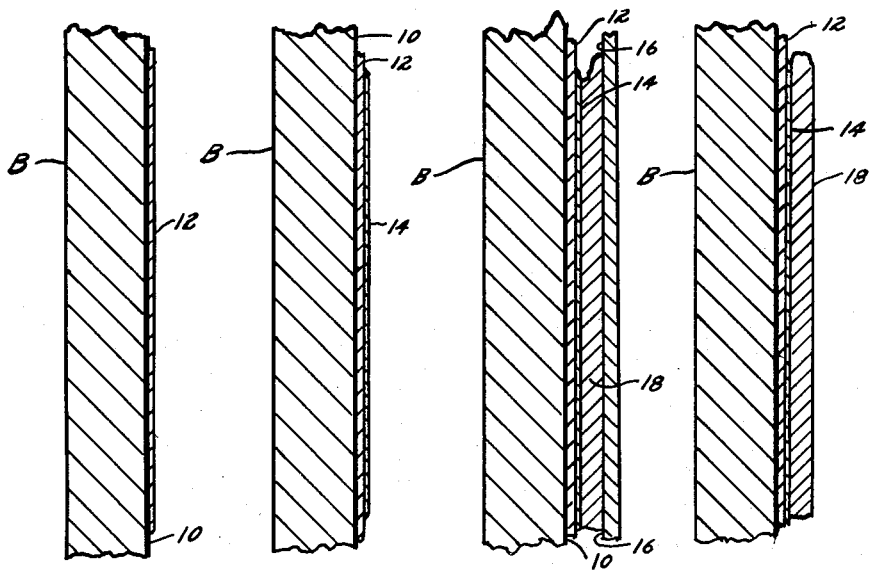
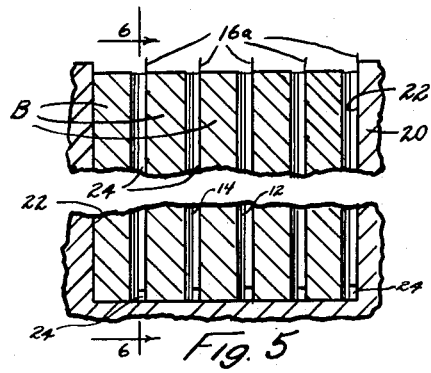
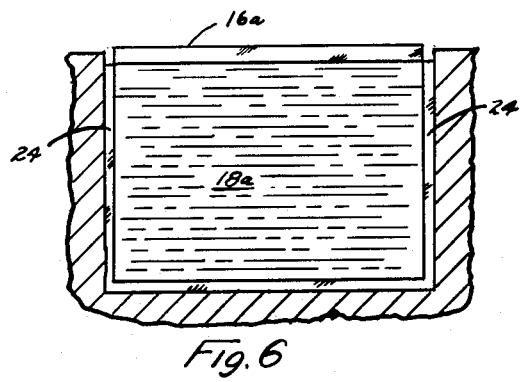
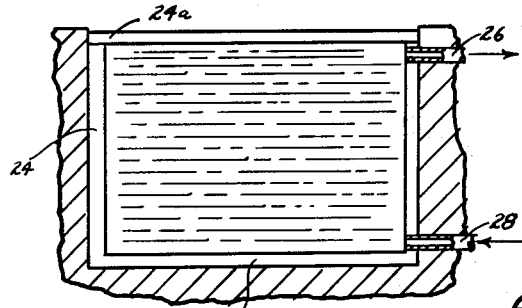

2,750,319

METHOD OF MAKING DECORATIVE PROTECTED PANEL

Milton A. Sanders, Elizabeth, N. J.

Application May 17, 1954, Serial No. 430,097

4 Claims. (Cl. 154—121)

This invention relates to an improved panel having an attractive surface decoration covered by a layer of non-opaque plastic having desired surface configuration and a method of making the same.

Boards of plywood, softboard, hardboard and the like, have good physical characteristics for many applications but it is difficult to provide surface ornamentation and ability to withstand liquids and other substances to which they are subject. As a consequence, these boards have been limited in their usefulness. In accordance with the disclosure of the present invention an improved method is provided for ornamenting the surface of boards of this type with any desired ornamentation and of covering the ornamented surface with a thin protective layer of plastic material. Briefly, in accordance with the disclosure of the present invention the board is painted with a thin layer of liquid thermosetting plastic; a fabric such as paper bearing the desired ornamentation is placed over the painted surface; and a protective layer of plastic is then placed over the fabric. The surface texture of the protective plastic layer may be either perfectly flat or may be embossed with one design or another as desired.

It is therefore a general object of the present invention to provide an improved method for protecting the surfaces of boards and a board so protected.

It is a further object of the present invention to provide an improved method for protecting the surface of a board which also permits the use of decorations on the surface.

A further object of the present invention is to provide an improved method for protecting the surface of a board in which the surface decoration is affixable by a suitably decorated fabric, such as paper.

It is still another object of the present invention to provide an improved method of decorating and protecting the surface of a board which can be effected by mass production methods and low cost to the end that the process may have maximum application in industrial uses.

The novel features which I believe to be characteristic of my invention are set forth with particularity in the appended claims. My invention itself, however, both as to the steps of the process and as to the apparatus used, together with further objects and advantages thereof, will best be understood by reference to the following description taken in conjunction with the accompanying drawings in which:

Figure 1 is an enlarged view in cross-section showing a board with a first thin layer of plastic material on the face thereof in accordance with the first step of the process of the present invention;

Figure 2 is a view like Figure 1 but showing a decorative fabric placed against the face of the board in accordance with the second step of the process;

Figure 3 is a view like Figures 1 and 2 but showing a protective plastic layer being placed on the surface of the board in accordance with the third step of the process;

Figure 4 is a view like Figures 1-3 showing the completed board;

Figure 5 is a view in cross-section of a cell in which the plurality of boards are being processed;

Figure 6 is a cross-sectional view through axis 6—6, Figure 5; and,

Figure 7 is a view like Figure 6 but showing an alternative form of the cell.

Referring now to Figure 1, the board to be decorated or protected is indicated generally at B. The surface to be so protected and decorated is indicated at 10. A thin layer of thermosetting plastic 12 is provided on the face 10 as shown in the figure. This layer may be placed on the board in any one of many ways all well known to the art. It may, for example, be sprayed on. It may also be painted on or a roll coating process used. Preferably, the plastic material is completely transparent, although it need not necessarily be such.

The thin coating 12 is of a thermosetting plastic material which cures—that is hardens—without the application of pressure or high temperature. Resins suitable for this purpose include polyester resin and epoxy resins as well as diallylphthalate resins.

The board B may be any type of board with suitable mechanical properties. For example, if a comparatively thin but strong board is desired a hardboard may be used. Preferably a so-called tempered hardboard is utilized because of its more favorable mechanical characteristics. On the other hand, if heat insulation and light weight are desired in the board B the board may be a softboard or, if the physical characteristics of plywood are suitable the board B may be a sheet of plywood having the desired thickness.

The face 10 of the board B is covered with a layer of decorative fabric 14, Figure 2, after it has been painted with plastic as shown in Figure 1 and before the plastic is cured. I prefer to use paper for this purpose. The printing on the paper is in accordance with the surface decoration desired, such as, for example, imitation wood grain. Alternatively, the fabric 14 may be cloth either with a printed design or of a type having an attractive appearance of its own. In either event, the decorative fabric is merely laid over the face of the board and the ripples gently pressed out. It will be found that with a coating 12 of appropriate thickness, the fabric may be readily placed on the face of the board without any substantial tendency towards ripples or other deformity.

The next step of the process is shown in Figure 3. In accordance with this step, the board B is placed in a cell, described hereafter in further detail, with the face 10 in spaced relation with a wall defining member 16. The space between wall 16 and the fabric 14, Figure 3, is filled with a non-opaque liquid thermosetting resin to form a layer 18, Figure 3. This resin is compatible with the resin used for the coating 12, Figure 1, so that when all of the resin has cured, the layer 18, the fabric 14, and the layer 12, form a unitary covering on the face 10 of the board B. I prefer to use a polyester resin, an epoxy resin or a diallylphthalate resin for this purpose. Also, I prefer to use a resin which is entirely transparent because such resin leads to a particularly attractive sense of depth on the final board. However, any non-opaque thermosetting resin may be employed inasmuch as the objective is to display the decoration on the fabric 14 and to protect the board B.

Figure 4 shows the final protected board after the plastic has cured and the board has been removed from the cell. It will be observed that with the final board the decorations of the fabric 14 may be viewed through the plastic layer 18 and that both the board and the plastic are protected by the layer 18.

In order to carry out the step of Figure 3 at a substantial production rate I prefer to use a cell of the general type shown in Figure 5. Briefly, this cell consists of an enclosure 20 defining a well 22 adapted to receive and contain liquid plastic. There are placed in the cell a plurality of spacers 16a, each of which on one side forms the wall 16 referred to in connection with the discussion of Figure 3. As shown in the cross-section of Figure 6, each of the spacers 16a has a U-shaped marginal gasket 24 against which the respective boards B rest so that each board seats with the margins of face 10 against the gasket 24, and with the opposite face of the board snugly seated against a spacer 16a, or in the case of the end board against the wall of the well 22.

When the boards are thus placed in position as shown in Figure 5, the well 22 is filled with liquid thermosetting resin 18a which fills the space between each spacer 16a and the respective board B. After the plastic has cooled, the boards and separators can be removed from the cell and the edges trimmed to provide the final formed sheets.

The well 22 is bounded by a material, such as metal or a plastic which is incompatible with the resin 18a. Such plastic materials include cellulose acetate, cellulose acetate butyrate and polyvinyl chloride. The spacers 16a are likewise made of a material which is not compatible with the resin 18a, such as metal or the above mentioned resins.

While the cell of Figures 5 and 6 is gravity filled, a pneumatically filled cell such as that shown in Figure 7 may be used. In this case, the gasket 24 extending about each of the spacers 16a has top portion 24a to form in conjunction with the board B a hermetically sealed space. An exhaust pipe 26 is provided at the top portion of the space and connected to a suitable pump (not shown). A similar intake pipe 28 is provided and is connected to a source of uncured resin to be drawn into the spaces defined by the separators 16a and the boards B. The pipes 26 and 28 are provided for each of the gaskets 24, these pipes being preferably connected to common headers for connection to a single pump and a single source of plastic.

The outer surface of the plastic layer 18, Figure 4, corresponds to that of the wall 16, Figure 3, or the spacer 16a, Figure 5. For many applications this surface is perfectly flat. However, if it is desired to have an embossed surface the requisite embossments can be made by shaping the face of wall 16 or the spacers 16a in form complementary to the desired embossment of the plastic layer 18. Thus if it is desired to have a mottled surface embossment on the layer 18, Figure 4, a similarly mottled configuration is provided in the wall 16 or the spacers 16a so that when the board and plastic are stripped from the wall or spacers as the case may be, the layer 18 takes on the surface of the wall or spacers.

While I have shown and described a specific embodiment of the present invention it will be understood that various modifications, both with respect to the steps of the process and to the materials used, may be made without departing from its true spirit and scope. I therefore intend by the appended claims to cover all variations and alternative embodiments as fall within their true spirit and scope.

What I claim as new and desire to obtain by Letters Patent of the United States is:

1. The method of making a board surfaced with a plastic material with a predetermined surface finish, comprising the steps of: coating the face of the board with a thin layer of thermosetting resin; placing a layer of decorative fabric over the resin to cover said face of the board, placing the board thus covered in a cell adapted to retain liquid and in spaced relation to a wall having predetermined surface finish; flowing a liquid, non-opaque, thermosetting resin into the cell to submerge the board and fill the space between said face of the board and said wall; and removing the board from the cell after the resin has solidified to provide a board with a decoration of the fabric and a surface complementary to that of the wall.

2. The method of simultaneously making a plurality of boards each surfaced with a plastic material, comprising the steps of: coating a face of each board with a thin layer of thermosetting resin; placing a layer of decorative fabric over the resin to cover said face of each board; placing the boards in a cell in parallel relation spaced by marginal gaskets and with a separator having a predetermined surface finish located in spaced relation with the said face of each board; flowing a liquid non-opaque thermosetting resin into the cell to submerge the boards and fill the space between said face of each board and the adjacent separator, and removing the boards from the cell and separators after the resin has solidified to provide boards with the decoration of the fabric and surface finish complementary to that of the separators.

3. The method of making a board surfaced with a plastic material with a predetermined surface finish, comprising the steps of: coating the face of the board with a thin layer of thermosetting resin; placing a layer of decorative fabric over the resin to cover said face of the board, placing the board thus covered in a cell adapted to retain liquid and in vertical spaced relation to a wall having predetermined surface finish; flowing a liquid, non-opaque, thermosetting resin into the cell to submerge the board and fill the space between said face of the board and said wall; and removing the board from the cell after the resin has solidified to provide a board with a decoration of the fabric and a surface complementary to that of the wall.

4. The method of simultaneously making a plurality of boards each surfaced with a plastic material, comprising the steps of: coating a face of each board with a thin layer of thermosetting resin; placing a layer of decorative fabric over the resin to cover said face of each board; placing the boards in a cell in vertical parallel relation spaced by marginal gaskets and with a separator having a predetermined surface finish located in spaced relation with the said face of each board; flowing a liquid non-opaque thermosetting resin into the cell to submerge the boards and fill the space between said face of each board and the adjacent separator, and removing the boards from the cell and separators after the resin has solidified to provide boards with the decoration of the fabric and surface finish complementary to that of the separators.

References Cited in the file of this patent

UNITED STATES PATENTS

| | | |
|---|---|---|
| 1,597,539 | Novotny et al. | Aug. 24, 1926 |
| 1,697,182 | Hall et al. | Jan. 1, 1929 |
| 2,084,081 | Faber | June 15, 1937 |
| 2,362,980 | Ball | Nov. 21, 1944 |